(12) United States Patent
Limseth

(10) Patent No.: US 9,708,047 B2
(45) Date of Patent: Jul. 18, 2017

(54) SYSTEM FOR CONTROLLING AND PROVIDING POWER TO AT LEAST ONE ELECTRIC MOTOR IN A VESSEL

(71) Applicant: Nodin Innovation AS, Tønsberg (NO)

(72) Inventor: Finn Limseth, Skallestad (NO)

(73) Assignee: Nodin Innovation AS, Tønsberg (NO)

( * ) Notice: Subject to any disclaimer, the term of this patent is extended or adjusted under 35 U.S.C. 154(b) by 172 days.

(21) Appl. No.: 14/426,915

(22) PCT Filed: Sep. 13, 2013

(86) PCT No.: PCT/EP2013/068967
§ 371 (c)(1),
(2) Date: Mar. 9, 2015

(87) PCT Pub. No.: WO2014/041105
PCT Pub. Date: Mar. 20, 2014

(65) Prior Publication Data
US 2015/0239546 A1 Aug. 27, 2015

(30) Foreign Application Priority Data
Sep. 14, 2012 (NO) .................................. 20121040

(51) Int. Cl.
*B63H 23/24* (2006.01)
*B63H 21/17* (2006.01)
(Continued)

(52) U.S. Cl.
CPC .............. *B63H 23/24* (2013.01); *B63H 21/17* (2013.01); *B63H 21/21* (2013.01); *B63H 21/213* (2013.01);
(Continued)

(58) Field of Classification Search
CPC ................................. B63H 23/24; B63H 21/17
(Continued)

(56) References Cited

U.S. PATENT DOCUMENTS 6,273,771 B1 * 8/2001 Buckley ............... B63H 21/213
114/144 RE
7,378,808 B2 * 5/2008 Kuras ..................... B60K 6/46
307/10.1
(Continued)

FOREIGN PATENT DOCUMENTS

GB 2 417 378 A 2/2006
GB 2 447 274 A 9/2008

OTHER PUBLICATIONS

Aqua Manoeuvra Systems . . . Marine Thruster & Propulsion Technologies; '360 Degree Control Systems . . . Electric "Rotatable" Thrusters—Remote Control'; nettside avbildet av web.archive.org; Feb. 2, 2012 (5 pages).
(Continued)

*Primary Examiner* — Lars A Olson
*Assistant Examiner* — Jovon Hayes
(74) *Attorney, Agent, or Firm* — Osha Liang LLP

(57) ABSTRACT

A system for controlling and providing power to at least one electric motor in a vessel, such as a motor in a thruster or a winch. The system includes an electric energy storage, a power controller device connected to the electric energy storage, at least one motor controller device, a first combined power and communication line interconnecting the power controller device and the at least one motor controller device, an electric motor connected to the motor controller device, and at least one operating device connected to the power controller device. The system may further include a second combined power and communication line that interconnects the power controller device and the at least one operating device. The first combined power and communication line operates with a DC voltage level which is at least twice the operational DC voltage level of the second power and communication line.

16 Claims, 15 Drawing Sheets

(51) Int. Cl.
*B63J 3/02* (2006.01)
*B63H 21/21* (2006.01)
*H02M 3/04* (2006.01)
*B63J 3/00* (2006.01)

(52) U.S. Cl.
CPC ................ *B63J 3/02* (2013.01); *H02M 3/04* (2013.01); *B63H 2021/216* (2013.01); *B63J 2003/002* (2013.01); *Y02T 70/529* (2013.01)

(58) Field of Classification Search
USPC .............................................................. 440/6
See application file for complete search history.

(56) References Cited

U.S. PATENT DOCUMENTS

| | | | | |
|---|---|---|---|---|
| 7,497,746 B2* | 3/2009 | Okuyama | ............... | B63H 20/12 |
| | | | | 440/1 |
| 7,993,175 B2* | 8/2011 | Hiroshima | ............. | B63H 20/00 |
| | | | | 440/84 |
| 7,997,222 B2* | 8/2011 | Hiroshima | ........... | B63H 21/213 |
| | | | | 114/144 RE |
| 8,192,239 B2* | 6/2012 | Ito | ........................ | B63H 21/22 |
| | | | | 440/1 |
| 2010/0033130 A1* | 2/2010 | Mizushima | ............ | B63H 23/24 |
| | | | | 320/126 |
| 2011/0195618 A1* | 8/2011 | Arbuckle | ............... | B63H 21/20 |
| | | | | 440/3 |
| 2012/0028515 A1* | 2/2012 | Stasolla | ................. | B63H 21/20 |
| | | | | 440/3 |
| 2012/0083173 A1* | 4/2012 | McMillan | .............. | B63H 21/20 |
| | | | | 440/6 |
| 2013/0157526 A1* | 6/2013 | Martin | ................... | B63H 21/17 |
| | | | | 440/2 |
| 2015/0239546 A1* | 8/2015 | Limseth | ................. | B63H 23/24 |
| | | | | 440/6 |

OTHER PUBLICATIONS

International Search Report for corresponding International Application No. PCT/EP2013/068967, mailed Dec. 9, 2013 (3 pages).
Written Opinion for corresponding International Application No. PCT/EP2013/068967, mailed Dec. 9, 2013 (5 pages).
Search Report for corresponding Norwegian Application No. 20121040, mailed Mar. 13, 2013 (2 pages).

* cited by examiner

SYSTEM FOR CONTROLLING AND PROVIDING POWER TO AT LEAST ONE ELECTRIC MOTOR IN A VESSEL

CROSS-REFERENCE TO RELATED APPLICATIONS

This application is a National Stage application of International Patent Application No. PCT/EP2013/068967, filed on Sep. 13, 2013, which claims priority to Norwegian Patent Application No. 20121040, filed on Sep. 14, 2012. Both Norwegian Patent Application No. 20121040 and International Patent Application No. PCT/EP2013/068967 are hereby incorporated by reference in their entirety.

TECHNICAL FIELD

The present invention relates to a system for controlling and providing power to an electric motor in a vessel.

BACKGROUND

Electric motors are used for various applications in vessels, e.g. in propeller propulsion devices and winches. For instance, electric bow thrusters and aft thrusters are frequently arranged on boats and small ships as secondary propulsion means for the purpose of improving and facilitating maneuvering and mooring operations. Electric motors are also used in winches, such as anchor and mooring winches. As an example, the Engbo XForce is an existing system wherein electric thrusters and winches are powered from a battery onboard the vessel and controlled remotely, e.g. my means of remote control.

GB-2447274 relates to a hybrid propulsion system for marine vessels. A combustion engine and an electrical motor/generator are connected to a transmission unit which drives a propeller shaft. A control system 25 controls the electrical power transfer between the motor/generator and an accumulator. The control system 25 also controls the combustion engine's speed.

SUMMARY

There is a need for providing an improved system for controlling and providing power to an electric motor in a vessel, e.g. with regard to energy efficiency, reliability, safety, durability, user-friendliness, and/or weight/material usage, etc.

The invention has been set forth in the claims.

BRIEF DESCRIPTION OF THE DRAWINGS

Possible features and advantages of the invention will be explained in closer detail in the detailed description below, with reference to the non-limiting examples illustrated in the figures.

DETAILED DESCRIPTION

Figure 1:
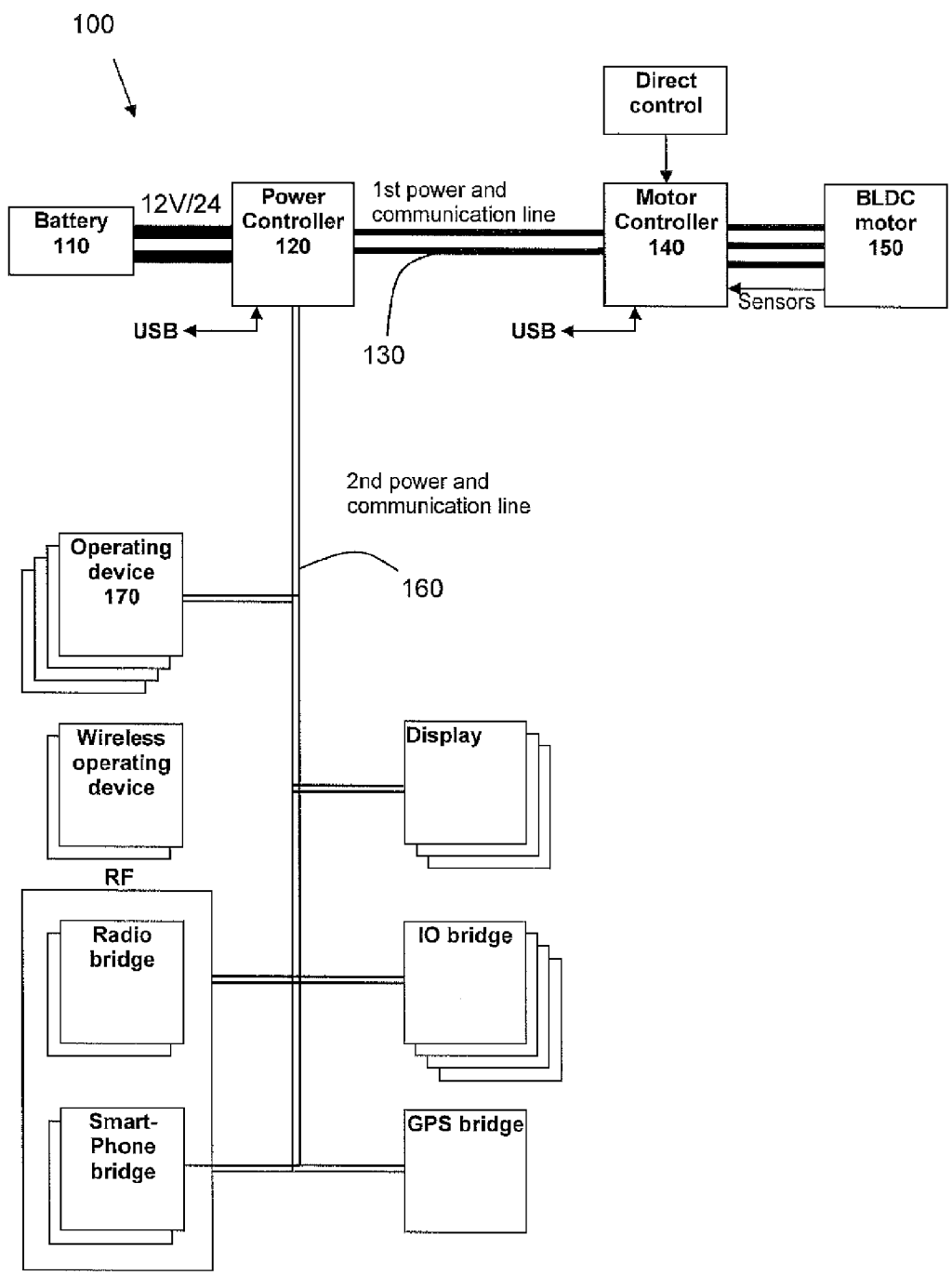
FIG. 1 is a schematic block diagram illustrating principles of a system for controlling and providing power to an electric motor in a vessel.

FIG. 1 is a schematic block diagram illustrating principles of a system 100 for controlling and providing power to at least one electric motor in a vessel.

The illustrated system comprises an electric energy storage 110 and a power controller device 120 which is connected to the electric energy storage 110. The electric energy storage 110 may include a rechargeable battery, e.g. of the chemical cell type, such as a lead-acid battery. Other possible rechargeable battery types include nickel cadmium (NiCd), nickel metal hydride (NiMH), or lithium based batteries.

The system 100 further comprises at least one motor controller device 140. A first combined power and communication line 130 interconnects the power controller device 120 and at the least one motor controller device 140.

The system further comprises at least one electric motor 150 which is connected to the motor controller device. Advantageously, the electric motor is a brushless DC motor.

In an aspect, the electric motor 150 is included in a propulsion device in the vessel. In another aspect, the electric motor is included in a winch device in the vessel.

The system further comprises at least one operating device 170 which is connected to the power controller device. Advantageously, the system includes a second combined power and communication line 160 which interconnects the power controller device 120 and the at least one operating device.

The operating device 170 may include a hand-operated operating device, which may be connected by wire to the power controller device 120. Such a manual operating device may include a hand-operated multi-function joystick. The operating device may include a wireless hand-operated multi-function joystick and a wireless communication channel providing communication between the wireless joystick and the second power and communication line.

In a particularly advantageous aspect, the first combined power and communication line 130 and the second combined power and communication line 160 are configured to operate with substantially different voltage levels. For instance, the first combined power and communication line may be configured to operate at a voltage level of about 50-300V, for instance about 100V. Such a relatively high voltage is selected in order to reduce cable power loss and reduce the requirements of cable dimensions for powering the motors and associated motor controller devices. The second combined power and communication line, on the other hand, may well be configured to operate at a voltage level of about 3-24 V, for instance about 12 V, which is necessary to power the operating devices and other devices and circuitry that shall be connected to the second combined power and communication line 160. Since the power consumption of these devices is substantially lower than the power consumption of motors and associated motor controller devices, the high voltage level of the first combined power and communication line 130 is not necessary for the second combined power and communication line 160.

The expression "substantially different voltage levels" should be understood to mean that the voltage levels differ with a factor of at least 2, preferably at least 4. Hence, in an advantageous aspect, the first combined power and communication line 130 should have a voltage level of at least two times the voltage level of the second combined power and communication line 160.

The first combined power and communication line 130 and the second combined power and communication line 160 may be configured as two-wire lines, wherein power and communication are transferred over the same pair of wires. In an aspect, general wire pairs may be used and no particular application-specific, proprietary or otherwise specialized bus connectors etc. are necessary.

The power controller device 120, as illustrated, may further be connected to at least one of the following: A wireless network communication device, a mobile network communication device, a GPS device, an input-output device, a display device.

Advantageously, the wireless network communication device, the mobile network communication device, the GPS device, the input-output device, and the display device are also connected to the power controller device 120 by means of the second combined power and communication line 160.

Figure 2:
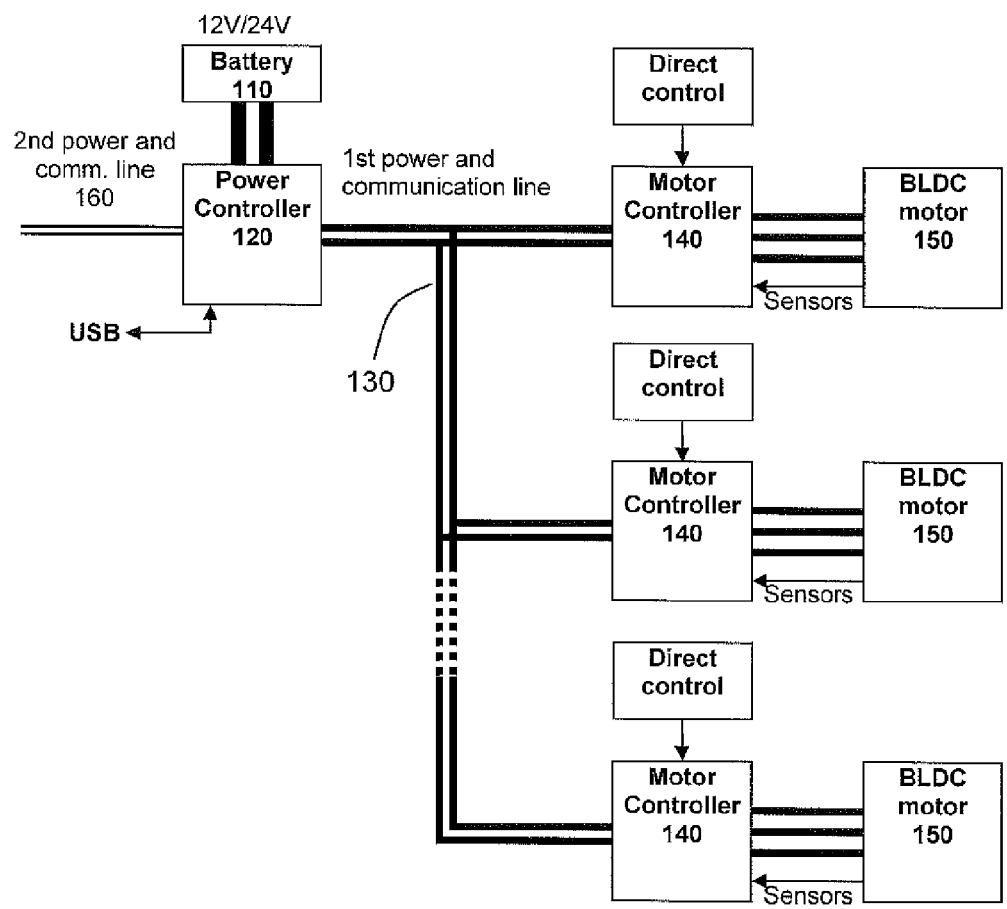
FIG. 2 is a schematic block diagram illustrating principles of an interconnection between a power controller device and a plurality of motor controller devices.

FIG. 2 is a schematic block diagram illustrating principles of an interconnection between a power controller device and a plurality of motor controller devices.

In the illustrated example, the power controller device 120 is connected in parallel to three motor controller devices 140. However, it should be understood that the power control device may be connected to any number of motor controller devices 140, including 1, 2, 3, 4, 5, 6, 7, 8, 9 and more. In a particular embodiment, six motor controller devices may be connected.

In the illustrated example, each motor controller device 140 is provided with a separate direct control device. Direct control may be enabled by test buttons arranged on a circuit board, to be operated manually by an operator, or by providing a connector for connection to external control equipment.

Figure 3:
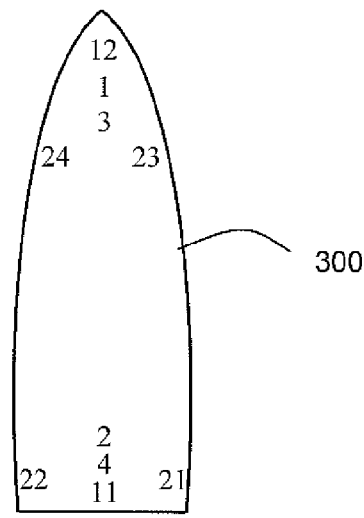
FIG. 3 is a schematic block diagram illustrating principles of various positions for locating a motor controlled by the system in a vessel.

FIG. 3 is a schematic block diagram illustrating principles of various positions, on a vessel 300, for locating a motor included in the system.

The electric motors in the system may be included in the vessel's propulsion devices (e.g., thrusters), or in winch devices (e.g., anchor winches) on the vessel, or in any other maritime rotating power devices wherein motors are used for providing movement of the vessel or for performing any suitable function or action onboard the vessel. The system may also be used for controlling and powering other electric motors, including pumps and fans onboard the vessel, and even any other electric power-consuming devices such as light or heating equipment, for instance.

On FIG. 3 thrusters have been shown at the following approximate positions on the vessel 300: 1 (bow thruster), 2 (aft thruster), 3 (second bow thruster in case of twin), 4 (second aft thruster in case of twin).

Anchor winches are shown at the following approximate positions: 11 (aft anchor winch), 12 (bow anchor winch).

Mooring winches are shown at the following appropriate positions: 21 (aft starboard mooring winch), 22 (aft port mooring winch), 23 (front starboard mooring winch), 24 (front port mooring winch).

Each of, or any number of the thrusters, or anchor winches, or mooring winches, may include a motor which is controlled by a motor controller as disclosed in the present specification.

It should be understood that FIG. 3 provides an illustrative example and that other configurations and numbers of thrusters, anchor winches, mooring winches and any other types of equipment may be arranged on the vessel 300.

Figure 4:
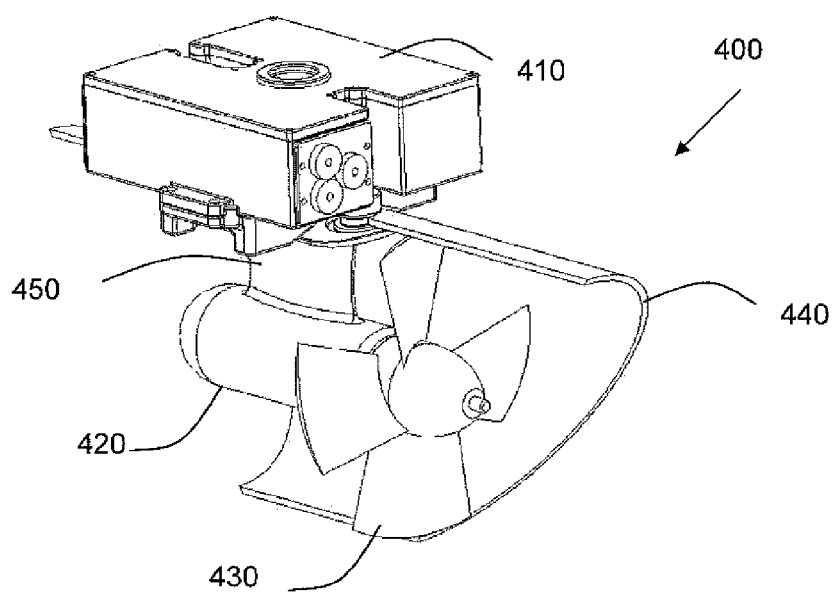
FIG. 4 is a partly cut perspective drawing illustrating principles of a thruster and a motor controller device.

FIG. 4 is a partly cut perspective drawing illustrating principles of a thruster 400 with a motor controller device.

The thruster includes a motor, embedded in a motor housing 420, and a propeller 430. The motor may drive the propeller directly or via a planet gear included in the motor housing 420. The motor housing and propeller is contained in a tubular member 440 open at both ends and shown partly cut for illustration purposes. The motor housing 420 is attached to the interior wall of the tubular member via an attachment element 450, e.g. a fin-shaped distance member. Wires for providing electric effect to the motor and possibly sensor signals in the opposite direction are lead through the attachment element 450 and via an aperture in the tubular member. A motor controller housing 410 is arranged at the exterior of the tubular member. The motor controller housing accommodates a motor controller device 140, corresponding to the motor controller device referred to in the remaining description of the system, e.g. the description above with reference to FIG. 1, and is arranged to supply electric power to power the motor.

It will be understood that a motor for use in a winch device, such as an anchor winch or a mooring winch, or a motor for another maritime purpose onboard the vessel, will also be provided with a corresponding motor controller device 140 in order to supply electric power to the motor.

Figure 5:
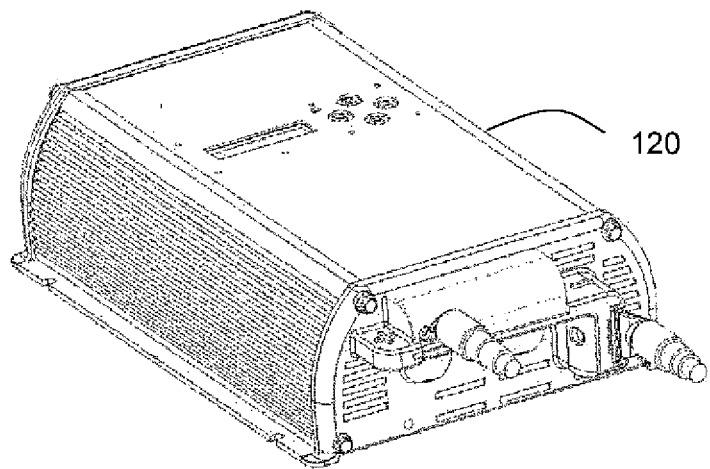
FIG. 5 is a perspective drawing illustrating principles of a power controller device.

FIG. 5 is a perspective drawing illustrating principles of a power controller device.

The power controller device 120 is included in a protective housing. Positive and negative connecting terminals for connection to the energy storage, e.g. battery, possibly via a main current switch, are shown. These connectors should be dimensioned for high currents, e.g. in the range of 100-600 A.

A fuse may be arranged in direct connection with the positive connecting terminal, indicated with a "+" on FIG. 5. The housing may be provided with a window for viewing a display and visual status/warning indicators, e.g. LEDs. The opposite side of the housing (not shown) may be provided with connectors to the first and second combined power and communication lines and possibly other, auxiliary connectors. The housing is provided with several apertures for ventilation in order to ensure cooling of internal power-demanding components in the power controller device. At least one fan may be included in the housing for improving ventilation and thus preventing overheating.

Figure 6:
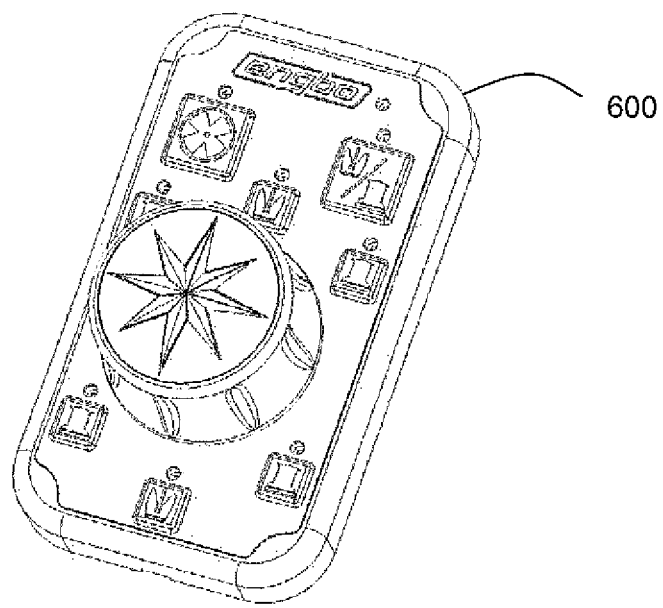
FIG. 6 is a perspective drawing illustrating principles of a hand-operated operating device.

FIG. 6 is a perspective drawing illustrating principles of a hand-operated operating device.

The operating device 600 may be connected to by wire or wirelessly to the power controller 120. The operating device includes a housing, a rotatable knob which may be used i.a. for thruster applications. The position of the rotatable knob may determine the speed and direction of a particular motor controlled by the system, e.g. a thruster motor or a winch motor. A number of switches or pushbuttons may be arranged around the circumference of the rotatable knob, e.g. at six positions around the knob. Each switch or pushbutton may have an associated visual indicator, e.g. LED. Additional switches or pushbuttons may be arranged to select a product group that shall currently be controlled by the operating device. One particular product group may be thrusters, a second product group may be winches. Other product groups, involving electric motors or other equipment types onboard a vessel, are possible.

The operating device may further be provided with additional visual indicators, such as a system LED and LEDs indicating the currently selected product group.

Figure 7:
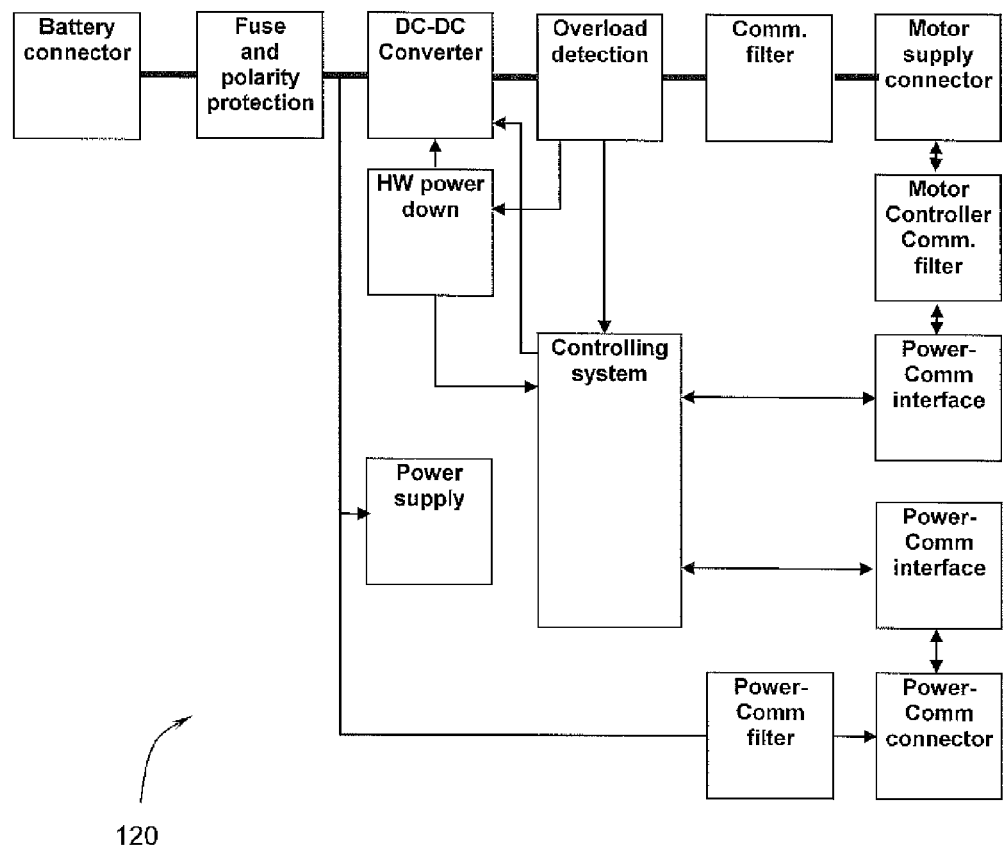
FIG. 7 is a schematic block diagram illustrating principles of a power controller device.

FIG. 7 is a schematic block diagram illustrating principles of a power controller device.

The power controller device 120 includes a battery connector, arranged to connect the electric energy storage, e.g. the battery. The power controller my e.g. be designed for 12V or 24V energy storage (battery) versions, although alternatives are possible. The battery connector is connected to a fuse, which may be replacable and be provided in an integrated fuse holder provided in the end cover. The concept of an integrated fuse holder may provide increased safety by reducing the number of high current connection points. It may also facilitate installation.

The battery connector is connected, via the fuse, to a polarity protection device, which is further connected to a DC-DC converter and a power communication filter. The power controller device, which has also been further illustrated in FIG. 8 and explained below, is connected to two power communication interfaces; one for providing two-way communication with one or more motor controllers (via the motor controller communication filter and motor supply connector) and one for providing two-way communication with the power communication bus which interconnects the one or more operating devices, via the power communication interface and the power communication connector.

The power controller device is configured to provide a DC voltage at the first power and communication line that corresponds to a voltage of the energy storage, e.g. the battery voltage, multiplied by a multiplying factor selected in the range of at least 2, preferably at least 4. The multiplying factor may e.g. be in the range of 6 to 25, and advantageously, the multiplying factor may be in the range of 8 to 10. As an example, when the supply voltage of the battery is 12V, and the maximum current to be drawn from the battery is 600 A, the output voltage provided to the first power and communication line may be about 100V and maximum output current about 50 A. The voltage multiplication and corresponding current reduction leads to reduced requirements of cable dimensions and reduced power loss in the cables that supply electric power to the motor controllers and subsequently to the motors.

In this aspect, the power controller device may advantageously be further configured to provide two-way data communication with the at least one motor controller via the first combined power and communication line. The data communication signal may be modulated onto the high voltage power portion of the overall first power and communication line signal. The communication signal may, e.g., use a data rate in the range of 20 to 100 kbits/s, for example 38.4 kbits/s. The communication may be based on e.g. half duplex, although alternatives exist. The communication signal may e.g. use a communication frequency in the range of 1 to 10 MHz. for example 5.5 MHz. A possible circuit for use as the communication interface may be a transceiver integrated circuit manufactured as SIG-60 (Yamar Electronics), although numerous alternatives exist.

The motor supply connector is powered by the DC-DC converter via an overload detection device, further connected to a communication filter. The power communication connector is powered by the output of the fuse and polarity protection device via a power communication filter.

As a result, the power controller device provides power for supplying a number of motors and communication signal for addressing and controlling the respective motors on the first combined power and communication line. Likewise, the power controller device is enabled to input communication signals from the motors into the power controller device's microcontroller.

As illustrated and already mentioned with respect to FIG. 1 and the corresponding description, the system may also comprise a second combined power and communication line which interconnects the power controller device and the at least one operating device. In such configurations, the power controller device is advantageously configured to provide a second DC voltage at the second power and communication line and further configured to provide two-way data communication with the at least one operating device via the first combined power and communication line. For the second combined power and communication line the voltage may be significantly less than the voltage used at the first combined power and communication line, since there is usually no device with a substantial power consumption connected to the second combined power and communication line. Hence, the DC voltage provided at the second combined power and communication line may be in the range of a normal low-power DC supply voltage for such devices as operation devices, network communication devices, I/O devices, display devices, etc. As an example, the DC voltage provided at the second combined power and communication line may be substantially the same as the DC voltage of the energy storage, i.e. the battery, e.g. 12V or 24V. Alternatives exist, e.g. in the range of 3V through 24V.

In such configurations, the power controller device may be further configured to provide the two-way data communication with the at least one operating device by modulating a communication signal onto the second DC voltage. The communication signal on the second combined power and communication line may, e.g., use a data rate in the range of 20 to 100 kbits/s, for example 38.4 kbits/s. The communication may be based on e.g. half duplex, although alternatives exist. The communication signal may e.g. use a communication frequency in the range of 1 to 10 MHz. for example 5.5 MHz. A possible circuit for use as the communication interface may be a transceiver integrated circuit manufactured as SIG-60 (Yamar Electronics), although numerous alternatives exist.

The power controller may advantageously be equipped with a soft start feature to reduce inrush current and to extend battery life. Start-up times may e.g. be in the range of 1-2 seconds, which is also advantageous with regard to security/safety. The timing and other features of the start-up may be controlled by the microcontroller in the power controller controlling system.

The DC-DC converter is configured to step up the supply (battery) voltage. To this end, a single ended converter may be used, although alternatives exist. Greater power outputs may be achieved e.g. by paralleling a plurality of converters, e.g. two, three, four or more converters.

The temperature in the DC-DC converter may be monitored by at least one temperature sensor connected to the microcontroller in the power controller.

A particular advantageous feature of the power controller device is that it may be configured so as not to establish the relatively high voltage on its first combined power and communication line output until safe connection with the interconnected motor controllers is proved.

The power controller device is further provided with a power supply, adapted to power its circuits and elements appropriately with power drawn from the battery connector via the fuse and polarity detection device.

Figure 8:
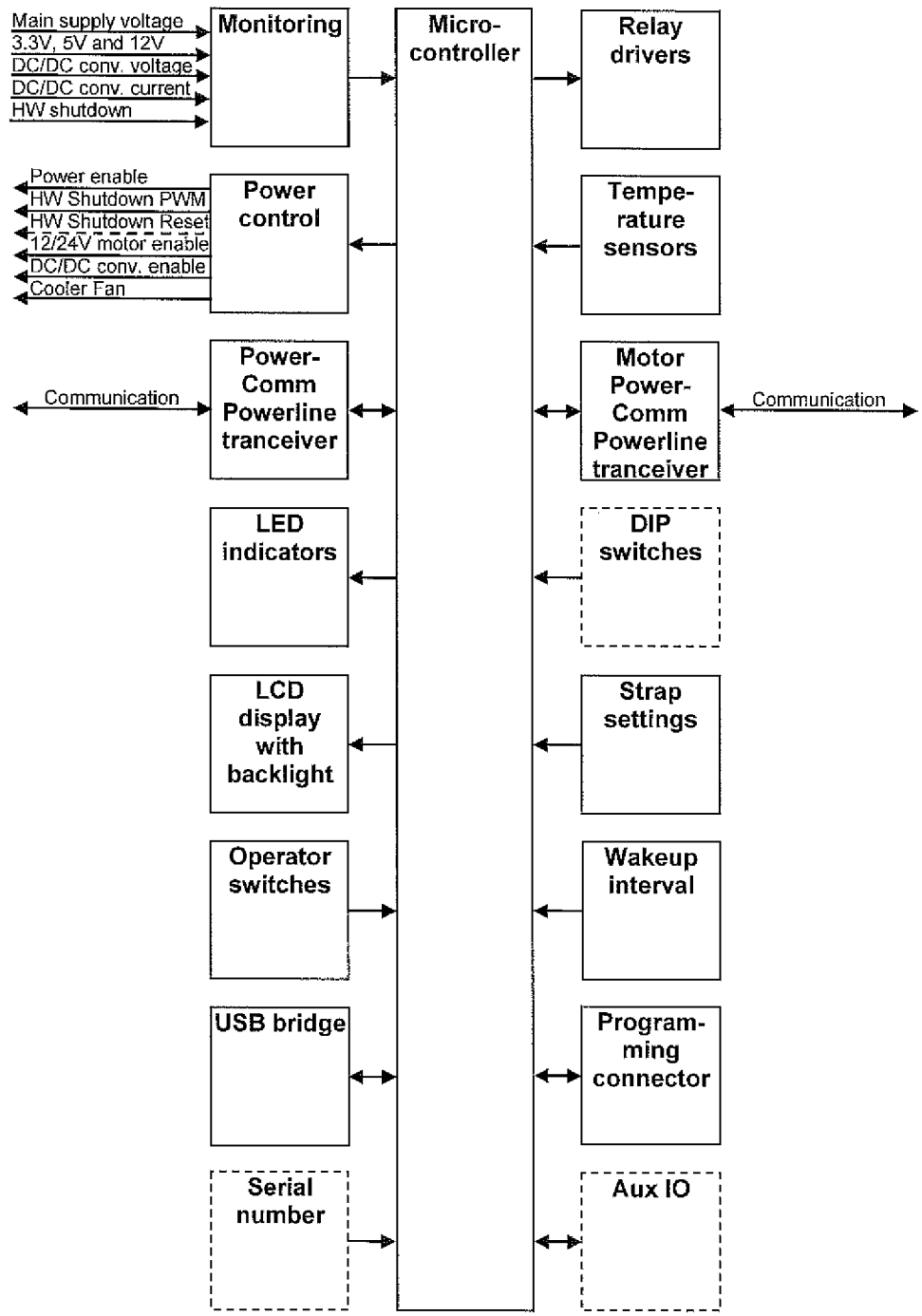
FIG. 8 is a schematic block diagram illustrating further principles of a power controller device.

FIG. 8 is a schematic block diagram illustrating further principles of a power controller device.

The power controller device includes a microcontroller which is communicatively connected to several input/output devices, including one or more of the following:

A monitoring input device, arranged to monitor external measurements, events or other figures such as main supply voltage (e.g. 3.3V, 5V, 12V), DC/DC converting voltage and current, hardware shutdown;

A power control output device, arranged to provide power control output signals;

A power communication powerline transceiver (I/O device), enabling communication signals to be transmitted to or received from the operating device(s) by means of the second combined power and communication signal.

Visual indicator output device, e.g. including LED indicators;

Display output device, e.g. LCD display with backlight, which may be arranged, i.a. for monitoring output voltage at the first combined power and communication line, current drawn by interconnected power control devices, and/or for displaying current configuration data, status, etc.;

Operating element input device, e.g. including operator switches;

Serial communication I/O device, e.g. USB bridge;

Product identification input device, e.g. for reading a stored serial number;

Relay output device(s), e.g. relay driver(s);

Temperature sensor(s) input device(s);

A motor power communication powerline transceiver (I/O device), enabling communication signals to be transmitted to or received from the motor controller(s) by means of the first combined power and communication signal;

DIP switches input device(s);

Strap settings input device(s);

Wakeup interval input device;

Programming connector;

Auxiliary I/O device.

The microcontroller includes a processor controlled by processor-executed instructions stored in a program memory, e.g. a flash memory or battery powered random access memory. The microcontroller further comprises random access memory for temporary data storage.

Figure 9:
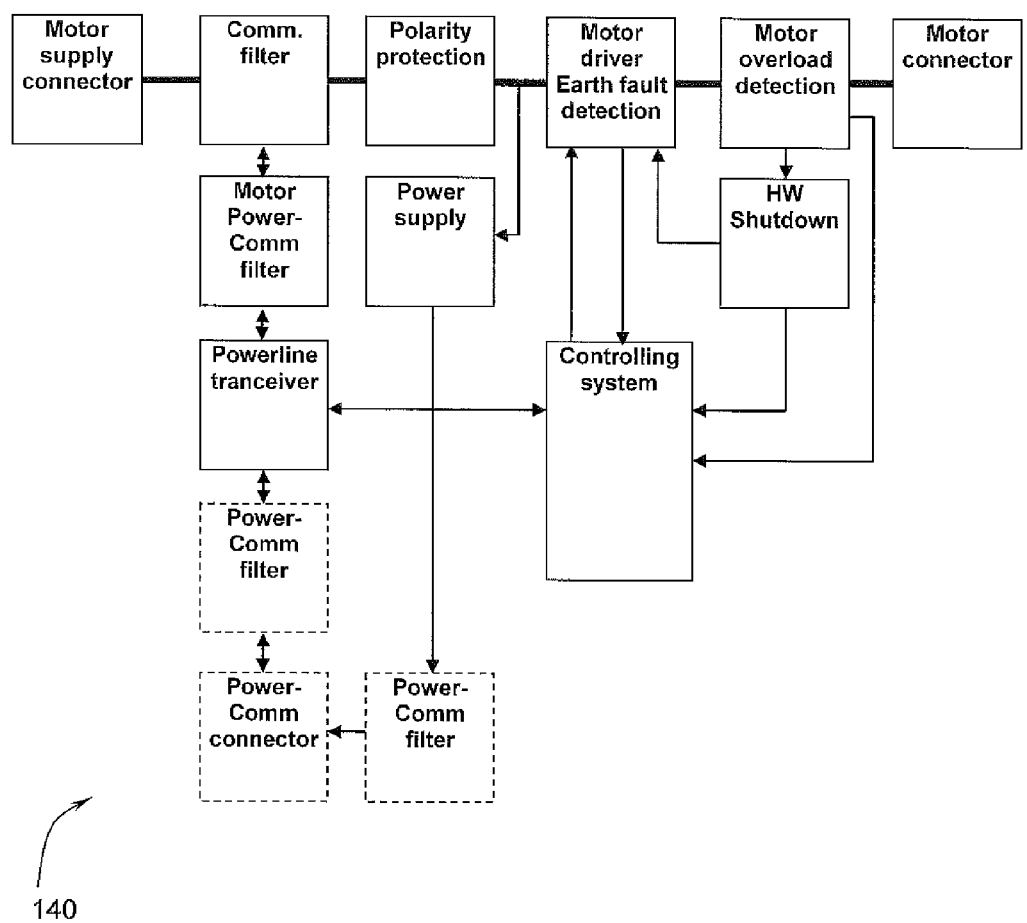
FIG. 9 is a schematic block diagram illustrating principles of a motor controller device.

FIG. 9 is a schematic block diagram illustrating principles of a motor controller device.

The power controller device 140 includes a motor supply connector, arranged to connect to the first combined power and communication line provided by the power controller device.

The motor supply connector is connected to a communication filter. The DC or power output of the filter is further connected to a polarity protection element. The communication signal output of the communication filter is interconnected with a motor power communication filter and further to a power line transceiver, which is in turn connected to the controller, denoted as "controlling system" in FIG. 9 and corresponding to the microcontroller illustrated in FIG. 10 and further explained below.

In typical configurations of the system where the electric motor is a brushless DC motor, the motor controller device associated with the motor includes a control circuit, e.g. a programmable logic device, which is configured to control the brushless DC motor by means of multiple frequency controlled outputs. As a typical example, the programmable logic device is configured to control the brushless DC motor by generating a 3-phase power output.

A motor driver, advantageously with an earth fault detection feature, is interconnected with the controller. The motor driver is in turn supplied with input power from the polarity protection element, and it supplies its output power to a motor overload detection device which in turn supplies the motor via the motor connector. The motor overload detection device also has an output to a hardware shutdown device, which provides appropriate signals to the controller and the motor driver earth fault detection device in case of a failure or overload situation.

Figure 10:
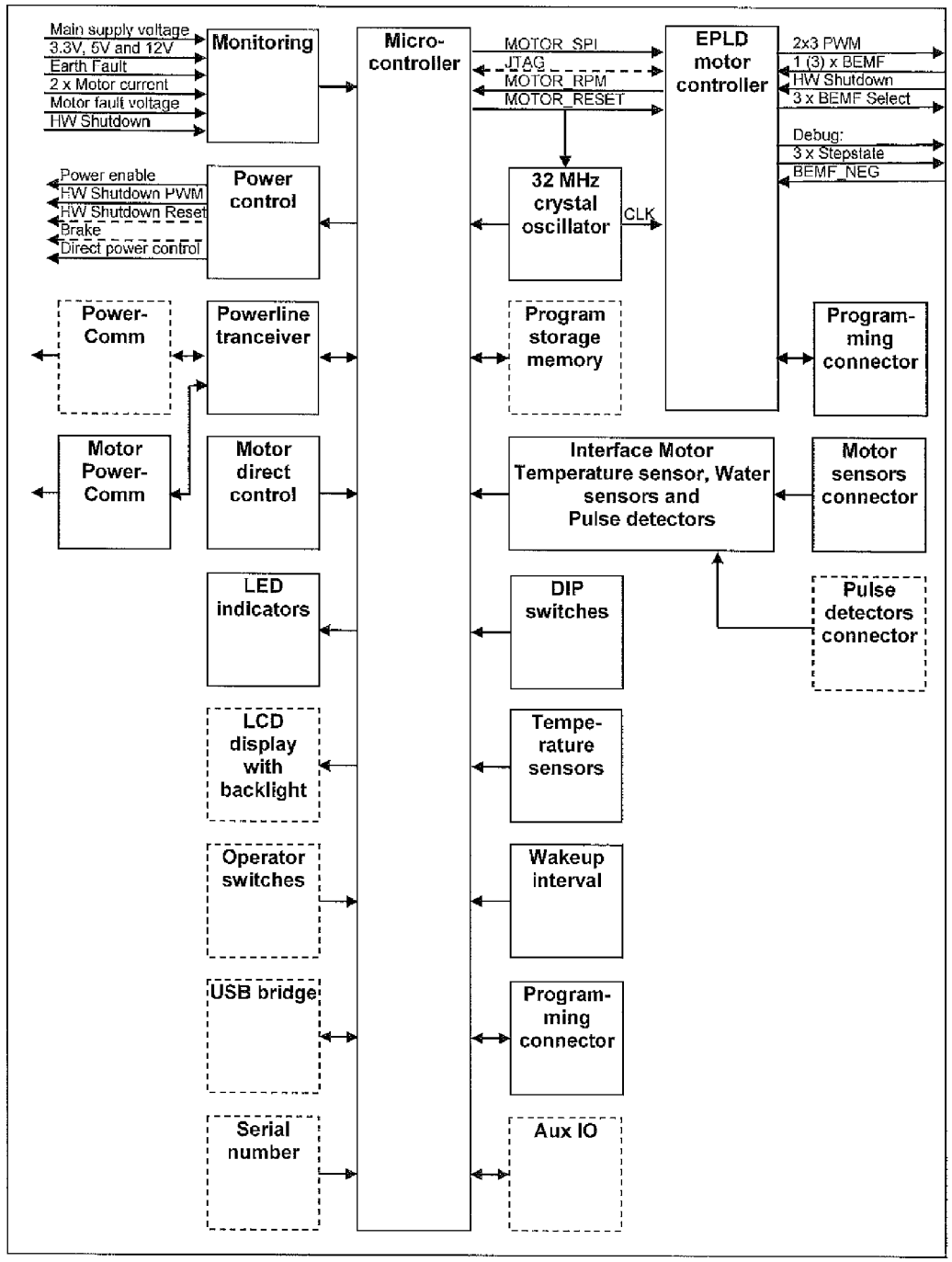
FIG. 10 is a schematic block diagram illustrating further principles of a motor controller device.

FIG. 10 is a schematic block diagram illustrating further principles of a motor controller device.

The motor controller device includes a microcontroller which is communicatively connected to several input/output devices, including one or more of the following:

A monitoring input device, arranged to monitor external measurements, events or other figures such as main supply voltage (e.g. 3.3V, 5v, 12v), DC/DC converting voltage and current, hardware shutdown;

A power control output device, arranged to provide power control output signals;

A power communication powerline transceiver (I/O device), providing communication signal to be transmitted to or received from the power controller device;

Motor direct control input device;

Visual indicator output device, e.g. including LED indicators;

Display output device, e.g. LCD display with backlight;

Operating element input device, e.g. including operator switches;

Serial communication I/O device, e.g. USB bridge;

Product identification input device, e.g. for reading a stored serial number;

A motor control circuit, denoted "EPLD motor controller" has been illustrated by example in FIG. 10. The motor control circuit may be embodied as a programmable logic device, such as an EPLD, or as another suitable control circuit, e.g. dedicated motor control microprocessor. The EPLD corresponds to the motor control circuit described with reference to FIG. 9 above. Hence, in case of a brushless DC motor, the control circuit is configured to control the brushless DC motor by means of multiple frequency controlled outputs, e.g. by generating a 3-phase power output. A programming connector for allowing programming of the EPLD may be connected to the EPLD.

A clock generator, denoted as 32 Mhz crystal oscillator by example, may be connected to the microcontroller and the motor controller device (EPLD).

Input device(s) for providing measurement signals associated with the motor, e.g. temperature sensor(s), water sensor(s), pulse detecor(s);
DIP switches input device(s);
Temperaure sensor input device(s);
Strap settings input device(s);
Wakeup interval input device;
Programming connector;
Auxiliary I/O device.

The microcontroller includes a processor controlled by processor-executed instructions stored in a program memory, e.g. a flash memory or battery powered random access memory. The microcontroller further comprises random access memory for temporary data storage.

Figure 11:
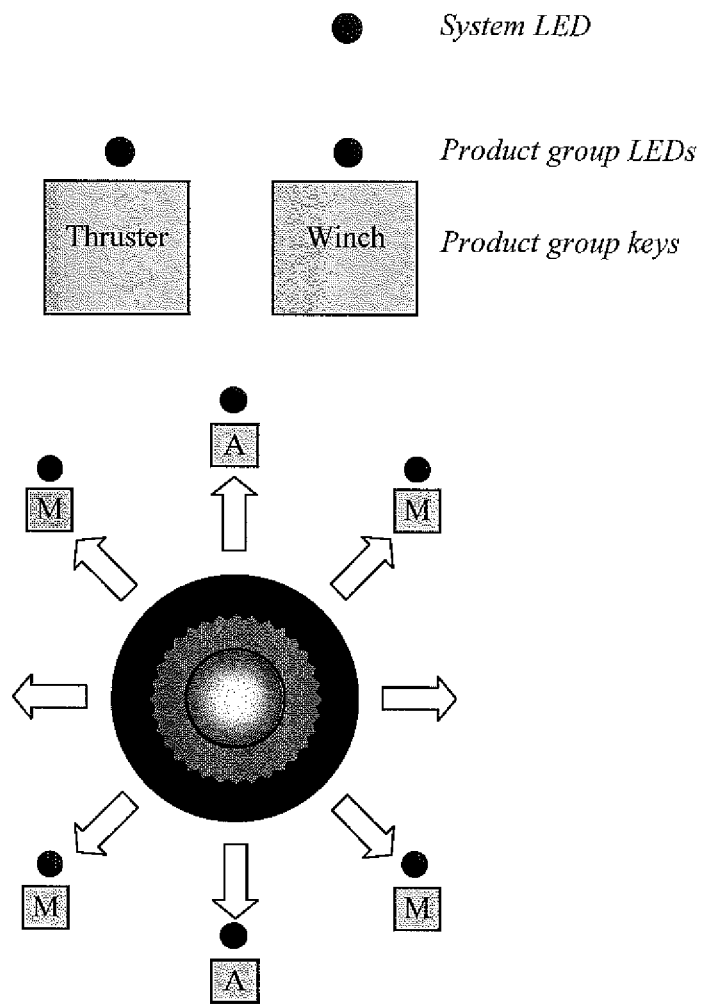
FIG. 11 is a schematic block diagram illustrating functional principles of a hand-operated operating device.

FIG. 11 is a schematic block diagram illustrating functional principles of a hand-operated operating device. It illustrates in further details the specification given above with reference to FIG. 6.

In certain aspects, the functionality of the hand-operated operating device may be implemented as a virtual operating device on a wireless communication device such as a smartphone. In such configurations, the wireless communication device may be enabled to execute, in use, an application program which emulates functions of a hand-operated operating device. The functions of the switches and rotatable knob, as explained with reference to FIG. 6 above, may then e.g. be facilitated by using a touch screen included in the smart phone as a hand-operated input device. Likewise, the functions of the indicators, as explained with reference to FIG. 6 above, may be enabled by display elements shown on the touch screen of the smartphone.

Figure 12:
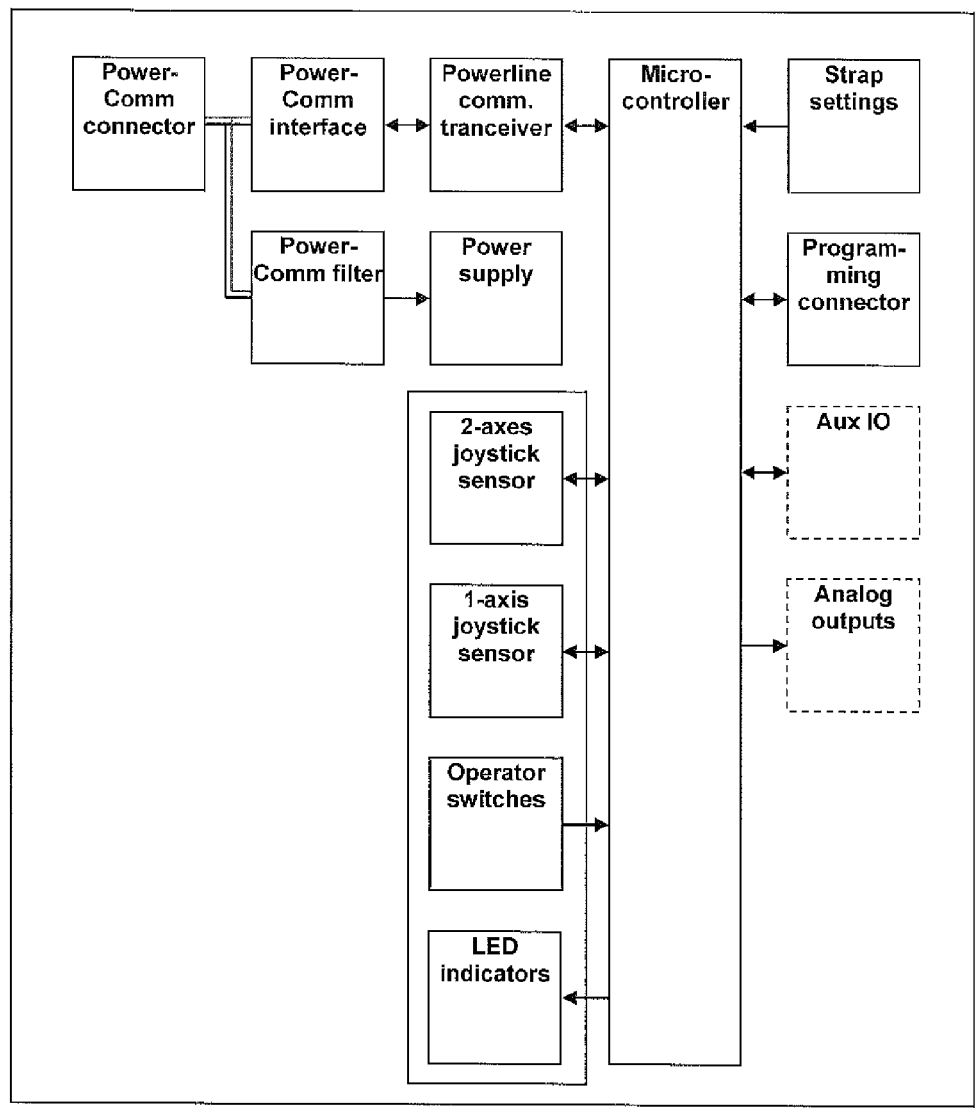
FIG. 12 is a schematic block diagram illustrating principles of a hand-operated operating device connected to the power controller device by wire.

FIG. 12 is a schematic block diagram illustrating principles of a hand-operated operating device connected to the power controller device by wire. In similar manner as the configurations shown in FIGS. 8 and 10, the hand-operated operating device is based on a microcontroller which is connected to the power and communication connector, i.e. the second combined power and communication line, via a power communication interface and a power line communication transceiver that enables two-way communication between the second combined power and communication line and the microcontroller. The power communication filter is arranged to filter out the DC portion of the second combined power and communication line signal, and thus enables power supply of the device.

The microcontroller is further interconnected with physical operating elements for providing manual operation, which may include 1, 2 and/or 3 axes joystick sensors, operator switches/pushbuttons, and the like. The microcontroller is further interconnected with indicators such as LED indicators.

As shown to the right in FIG. 12, the microcontroller may further be interconnected with a strap setting device, a programming connector, and possibly auxiliary I/O and analog outputs, if necessary.

The hand-operated operating device may as an alternative be implemented as a wireless operating device (remote control). In this case the hand-operated operating device should be powered by a separate battery instead of the arrangement supplying power from the second combined power and communication line, and an appropriate wireless channel should be established for providing a local communication between the hand-operated operating device and a stationary wireless communication device which is connected to and powered by the second combined power and communication line. An example of such a stationary wireless communication device may be the radio bridge device illustrated in FIG. 13 and described below.

Figure 13:
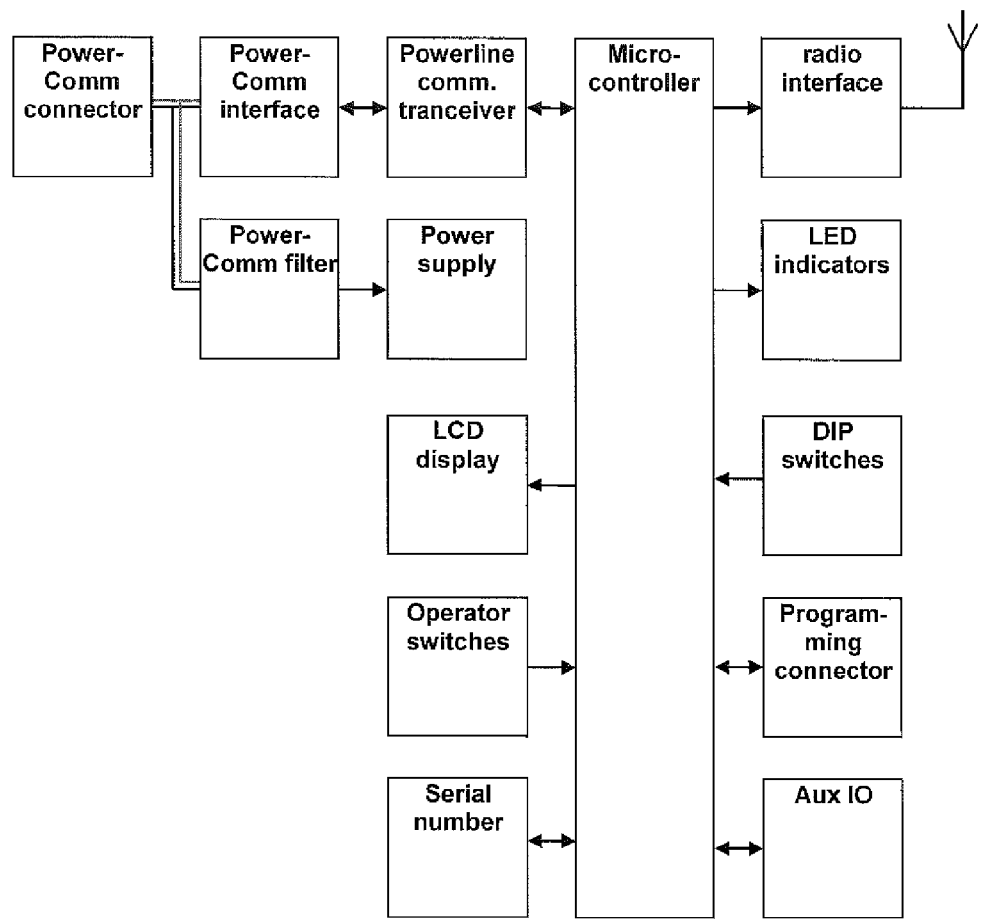
FIG. 13 is a schematic block diagram illustrating principles of a radio bridge device.

FIG. 13 is a schematic block diagram illustrating principles of a radio bridge device.

In similar manner as the configuration shown in e.g. FIG. 12, the radio bridge device is based on a microcontroller which is connected to the power and communication connector, i.e. the second combined power and communication line, via a power communication interface and a power line communication transceiver that enables two-way communication between the second combined power and communication line and the microcontroller. The power communication filter is arranged to filter out the DC portion of the second combined power and communication line signal, and thus enables power supply of the device.

The microcontroller is further interconnected with a radio interface which provides wireless radio communication with e.g. a wireless hand-operated operating device as described above with reference to FIG. 12, or other suitable wireless devices in the coverage area of the radio bridge device, i.e., typically onboard the vessel.

The microcontroller may further be interconnected with a display such as an LCD display, operator switches, indicators, DIP switches etc.

Figure 14:
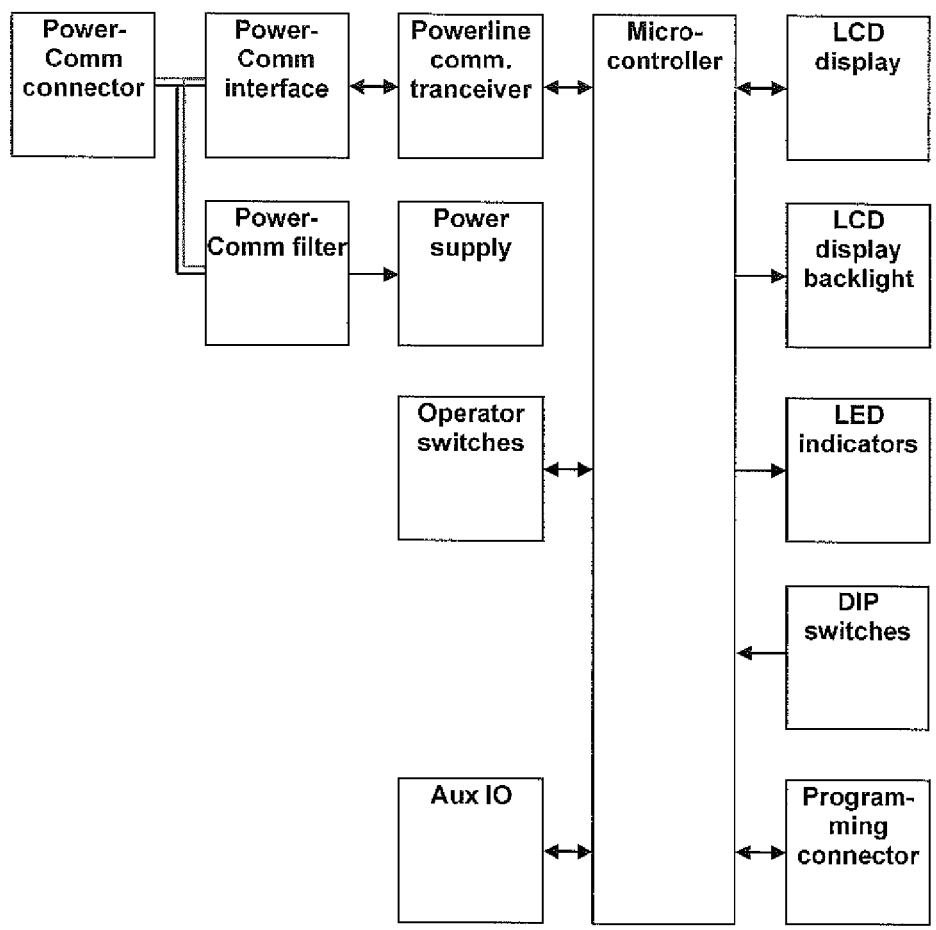
FIG. 14 is a schematic block diagram illustrating principles of a display device.

FIG. 14 is a schematic block diagram illustrating principles of a display device.

In similar manner as the configuration shown in e.g. FIG. 12, the display device is based on a microcontroller which is connected to the power and communication connector, i.e. the second combined power and communication line, via a power communication interface and a power line communication transceiver that enables two-way communication between the second combined power and communication line and the microcontroller. The power communication filter is arranged to filter out the DC portion of the second combined power and communication line signal, and thus enables power supply of the device.

The microcontroller is further interconnected with a display such as an LCD display, possibly with backlight features.

The microcontroller may further be interconnected with operator switches, auxiliary I/O, indicators, DIP switches, programming connector, etc.

Figure 15:
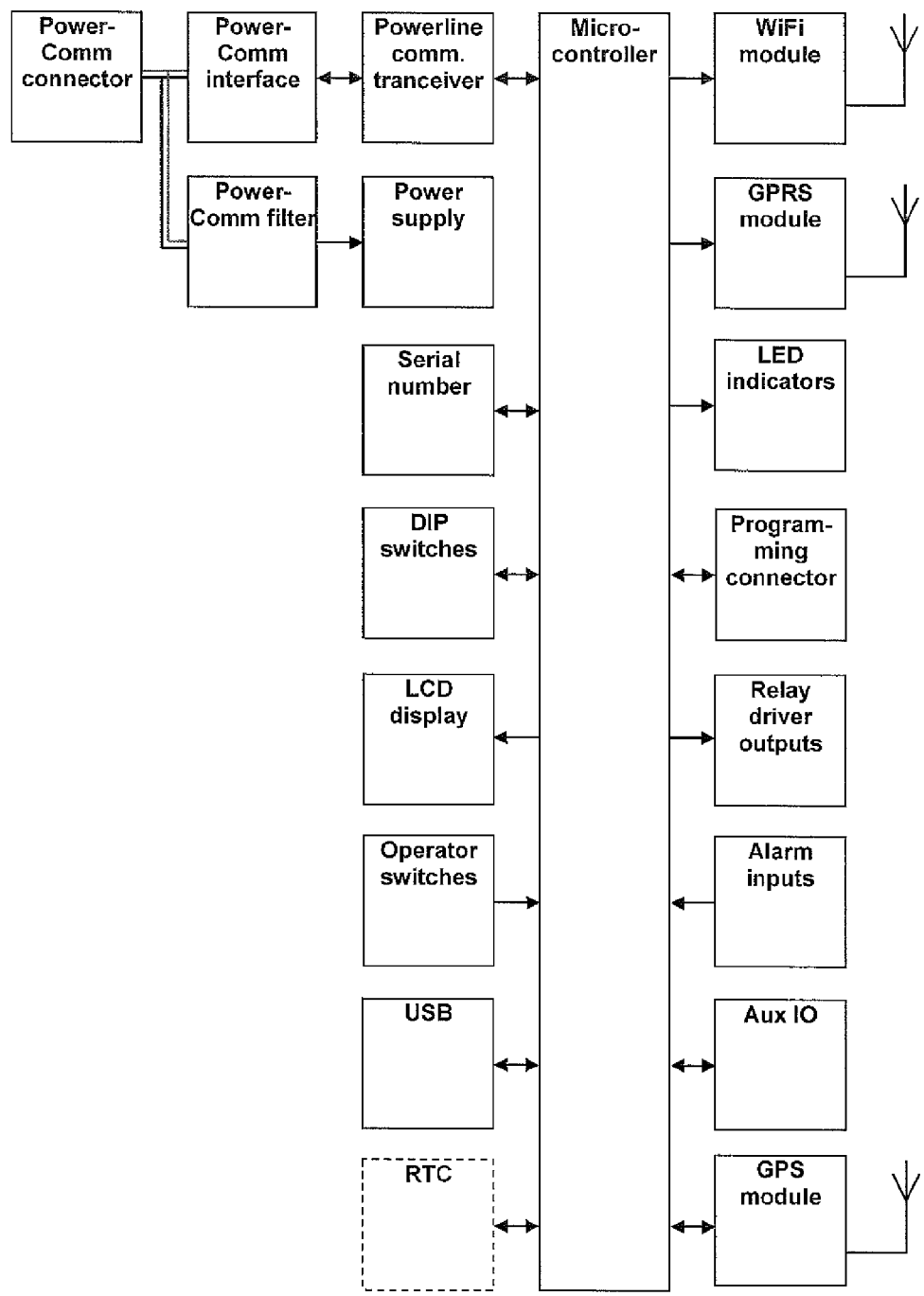
FIG. 15 is a schematic block diagram illustrating principles of a smartphone bridge device.

FIG. 15 is a schematic block diagram illustrating principles of a smartphone bridge device.

The smartphone bridge device may be considered as an example of either a wireless network communication device or a mobile network communication device, or both, as will appear from the explanation below.

In similar manner as the configuration shown in e.g. FIG. 12, the display device is based on a microcontroller which is connected to the power and communication connector, i.e. the second combined power and communication line, via a power communication interface and a power line communication transceiver that enables two-way communication between the second combined power and communication line and the microcontroller. The power communication filter is arranged to filter out the DC portion of the second combined power and communication line signal, and thus enables power supply of the device.

The microcontroller is further interconnected with wireless and/or mobile communication modules. In the embodiment shown, both a WiFi communication module and a GPRS mobile communication modules have been shown. It should be understood that any one of these modules may be necessary to provide the necessary functionality of the smartphone bridge device, depending on circumstances and requirements.

The microcontroller may further be interconnected with a GPS (Global Positioning System) receiver, which is configured and arrange to acquire geographical position data to the microcontroller. Such data may be useful for, i.a., tracking the vessel in a theft situation.

The microcontroller may further be interconnected with operator switches, display, auxiliary I/O, indicators, DIP switches, programming connector, serial communication (e.g. USB), alarm inpiuts, relay driver outputs, etc.

The smartphone bridge enables communication between the system for controlling and providing power to at least one motor in the vessel and a smartphone either on board the vessel (in particular, using WiFi or other local communication) or located at another position (in particular, using mobile communication such as GPRS). Such an arrangement and configuration may, e.g., enable remote control of motors, e.g., thrusters and winches onboard the vessel, by means of an application program which executes on the smartphone, and which emulates the graphical user interface functions of a hand-operated operating device (remote control). Further possible advantages of providing the system with wireless and/or mobile communications include: providing remote diagnosis/error detection, enabling program upgrade or update, allowing transfer of alarm/warning data, e.g. relating to temperature conditions (such as frost), theft/burglar alarm data, including transfer of geographical tracking data, etc.

Figure 16:
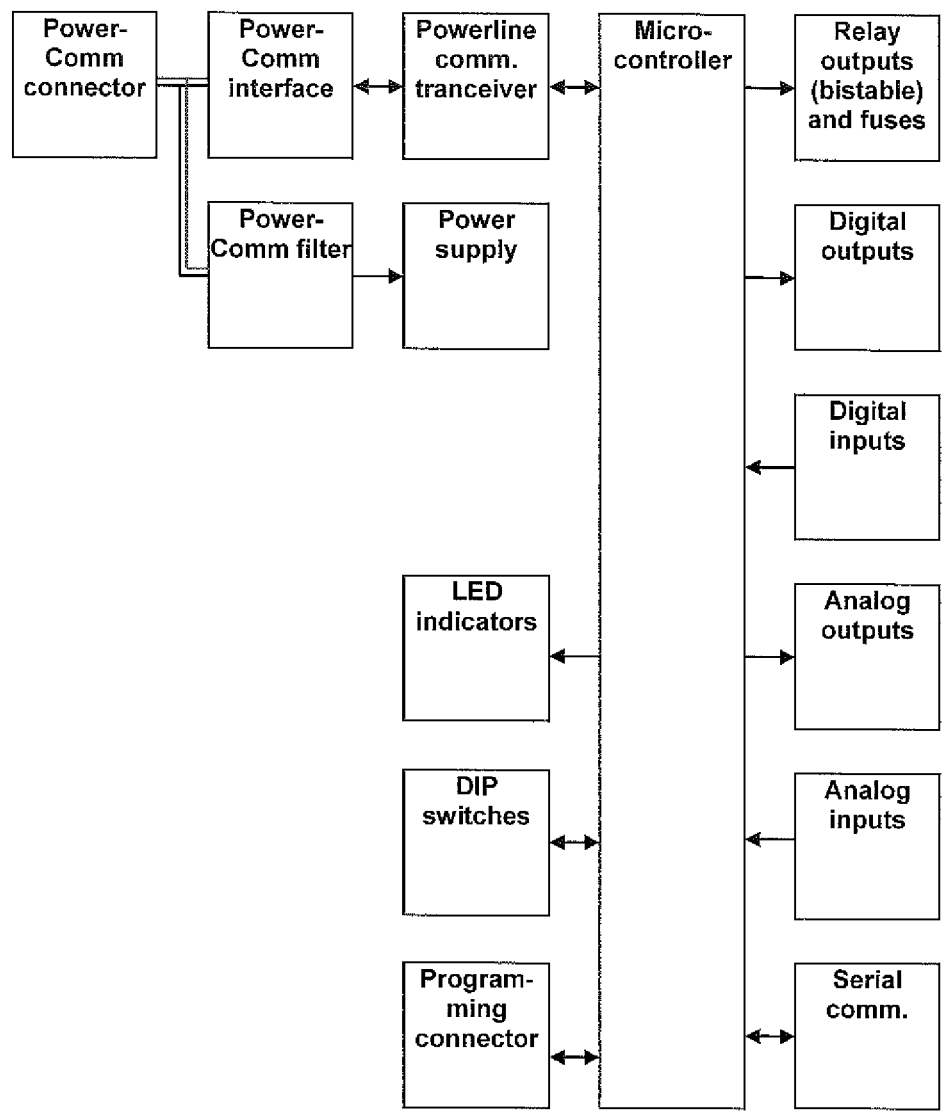
FIG. 16 is a schematic block diagram illustrating principles of an input/output bridge device.

FIG. 16 is a schematic block diagram illustrating principles of an input/output bridge device.

In similar manner as the configuration shown in e.g. FIG. 12, the I/O bridge device is based on a microcontroller which is connected to the power and communication connector, i.e. the second combined power and communication line, via a power communication interface and a power line communication transceiver that enables two-way communication between the second combined power and communication line and the microcontroller. The power communication filter is arranged to filter out the DC portion of the second combined power and communication line signal, and thus enables power supply of the device.

The microcontroller may further be interconnected with relay outputs and possibly associated fuses. It may also be interconnected with digital outputs, digital outputs, analog inputs and analog outputs, or any combination of such inputs and/or outputs.

The microcontroller may further be interconnected with indicators, e.g. LEDs, DIP switches, programming connector, a serial communication device, etc.

Figure 17:
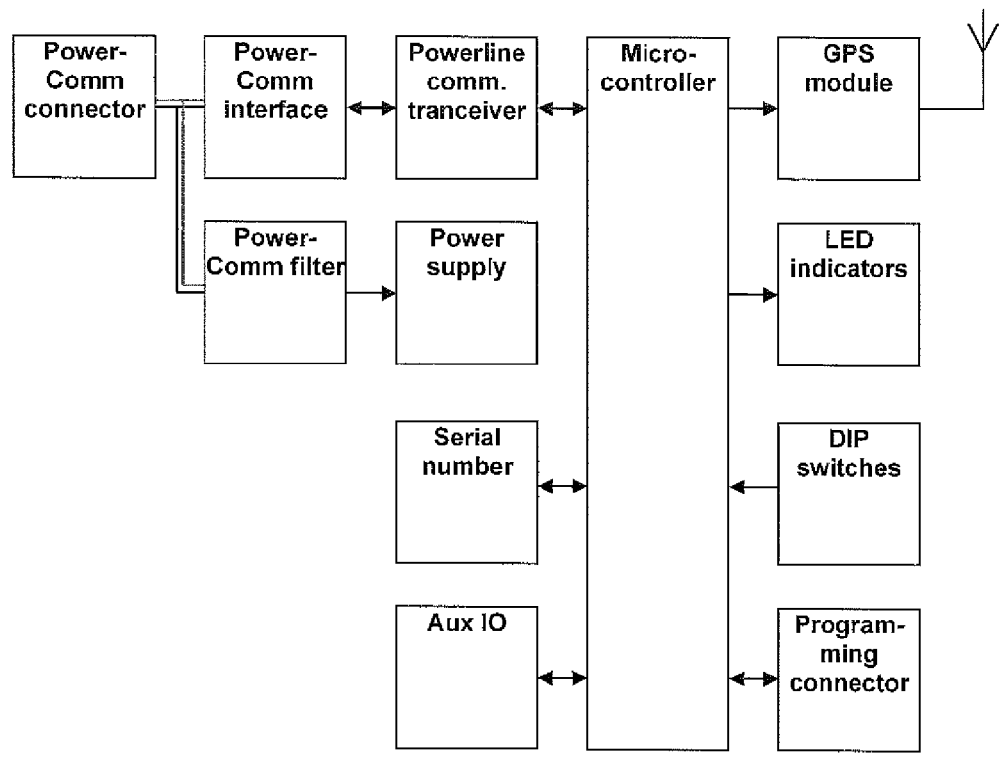
FIG. 17 is a schematic block diagram illustrating principles of GPS bridge device.

FIG. 17 is a schematic block diagram illustrating principles of a GPS bridge device.

In similar manner as the configuration shown in e.g. FIG. 12, the display device is based on a microcontroller which is connected to the power and communication connector, i.e. the second combined power and communication line, via a power communication interface and a power line communication transceiver that enables two-way communication between the second combined power and communication line and the microcontroller. The power communication filter is arranged to filter out the DC portion of the second combined power and communication line signal, and thus enables power supply of the device.

The microcontroller is interconnected with a GPS (Global Positioning System) device, which is configured and arrange to acquire geographical position data to the microcontroller.

The microcontroller may further be interconnected with auxiliary I/O, indicators, DIP switches, programming connector, etc.

The invention has been described in detail above as non-limiting examples. It should be understood that the invention can be modified to include various alterations and substitutions. Hence, the invention is not limited by the foregoing detailed description, but by the scope of the claims.

The invention claimed is:

1. A system for controlling and providing power to a plurality of electric motors in a vessel, the system comprising;
   an electric energy storage;
   a power controller device, connected to the electric energy storage;
   a plurality of motor controller devices;
   a first combined power and communication line interconnecting the power controller device and the plurality of motor controller devices;
   an electric motor connected to each motor controller device;
   at least one operating device connected to the power controller device; and
   a second combined power and communication line interconnecting the power controller device and the at least one operating device,
   wherein the power controller device is configured to provide a second DC voltage at the second power and communication line and further configured to provide two-way data communication with the at least one operating device via the first combined power and communication line.

2. The system according to claim 1,
   wherein the first combined power and communication line is configured to operate with an operational voltage level at least two times the operational voltage level of the second power and communication line.

3. The system according to claim 1,
   wherein the power controller device includes a DC-DC converter and is configured to provide a first DC voltage at the first power and communication line, the first DC voltage corresponding to a voltage of the energy storage multiplied by a multiplying factor larger than 2.

4. The system according to claim 3,
   wherein the power controller device is further configured to provide two-way data communication with the plurality of motor controller devices via the first combined power and communication line.

5. The system according to claim 4,
   wherein the power controller device is configured to provide the two-way data communication by modulating a communication signal onto the first DC voltage.

6. The system according to claim 1,
   wherein the power controller device is configured to provide the two-way data communication with the at least one operating device by modulating a communication signal onto the second DC voltage.

7. The system according to claim 1,
   wherein the operating device includes a hand-operated operating device which includes a hand-operated multi-function joystick.

8. The system according to one of the claim 1,
   wherein the power controller device is further connected to at least one device selected from the following set:
   a wireless network communication device, a mobile network communication device, a GPS device, an input-output device, a display device.

9. The system according to claim 8,
wherein the wireless network communication device, the mobile network communication device, the GPS device, the input-output device, or the display device are also connected to the power controller device by means of the second combined power and communication line.

10. The system according to claim 8, further comprising a wireless communication device executing an application program which emulates functions of a hand-operated operating device.

11. The system according to one of the claim 1,
wherein the power controller device is configured so as not to establish a voltage on its first combined power and communication line output until connection with the interconnected motor controllers is confirmed.

12. The system according to claim 1,
wherein each electric motor is a brushless DC motor, and
wherein each motor controller device includes a motor control circuit configured to control the brushless DC motor by means of multiple frequency controlled outputs.

13. The system according to claim 12,
wherein the programmable logic device is configured to control the brushless DC motor by generating a 3-phase power output.

14. The system according to claim 1,
wherein each electric motor is included in a propulsion device or a winch device in the vessel.

15. The system according to claim 2,
wherein the power controller device includes a DC-DC converter and is configured to provide a first DC voltage at the first power and communication line, the first DC voltage corresponding to a voltage of the energy storage multiplied by a multiplying factor larger than 2.

16. The system according to claim 2,
wherein the power controller device is configured so as not to establish a voltage on its first combined power and communication line output until connection with the interconnected motor controllers is confirmed.

* * * * *